United States Patent [19]

Speckhart et al.

[11] Patent Number: 5,143,201
[45] Date of Patent: Sep. 1, 1992

[54] CARRIER ASSEMBLY

[75] Inventors: Bernard Speckhart, Short Hills; Paul M. Berson, Mountain Lakes, both of N.J.

[73] Assignee: White Conveyors, Inc., Kenilworth, N.J.

[21] Appl. No.: 643,411
[22] Filed: Jan. 22, 1991
[51] Int. Cl.⁵ .......................................... B65G 43/00
[52] U.S. Cl. .............................. 198/502.3; 198/349.95; 198/465.4; 198/486.1; 198/678.1; 209/937
[58] Field of Search ............ 198/349.95, 502.3, 465.4, 198/486.1, 478.1, 680; 209/937

[56] References Cited

U.S. PATENT DOCUMENTS

| | | | |
|---|---|---|---|
| 1,861,600 | 6/1932 | Harrison . | |
| 1,998,109 | 4/1935 | Walter, Jr. | 211/1.5 |
| 2,449,669 | 9/1948 | Pohlers | 198/168 |
| 2,536,575 | 1/1951 | Seldin | 198/168 |
| 2,573,334 | 10/1951 | Hitz | 198/173 |
| 2,583,968 | 1/1952 | Rosseau | 263/6 |
| 2,750,897 | 6/1956 | Davis | 104/96 |
| 2,751,091 | 6/1956 | Freeman | 214/11 |
| 2,846,049 | 8/1958 | Carlson | 198/130 |
| 2,861,676 | 11/1958 | Rasmussen et al. | 198/218 |
| 2,918,164 | 12/1959 | Austin et al. | 198/177 |
| 2,947,407 | 8/1960 | Wood | 198/66 |
| 2,998,136 | 8/1961 | Gerisch | 209/122 |
| 3,113,659 | 12/1963 | Oda et al. | 198/25 |
| 3,124,236 | 3/1964 | Gerisch | 198/169 |
| 3,151,730 | 10/1964 | Buenten | 198/38 |
| 3,164,245 | 1/1965 | Juengel | 198/129 |
| 3,194,383 | 7/1965 | Kuwertz | 198/38 |
| 3,247,952 | 4/1966 | Kozlosky | 198/173 |
| 3,403,767 | 10/1968 | Gerisch | 198/20 |
| 3,415,352 | 12/1968 | Gerisch | 198/38 |
| 3,422,950 | 1/1969 | Bachmann | 198/177 |
| 3,454,148 | 7/1969 | Harrison | 198/28 |
| 3,469,667 | 9/1969 | Gerisch | 193/40 |
| 3,511,359 | 5/1970 | Gerisch | 198/126 |
| 3,557,935 | 1/1971 | Gerisch | 198/38 |
| 3,581,887 | 6/1971 | Radutsky et al. | 209/73 |
| 3,622,000 | 11/1971 | McClenny | 209/121 |
| 3,786,911 | 1/1974 | Milazzo | 198/219 |
| 3,942,340 | 3/1976 | Kirkby | 68/3 R |
| 3,961,699 | 6/1976 | Hirsch | 198/26 |
| 4,018,327 | 4/1977 | Goodman et al. | 198/723 |
| 4,027,598 | 6/1977 | Swilley | 104/162 |
| 4,036,365 | 7/1977 | Rosenfeld | 209/73 |
| 4,239,435 | 12/1980 | Weiss et al. | 209/937 |
| 4,817,778 | 4/1989 | Davidson | 198/465.4 |
| 4,943,198 | 7/1990 | McCabe | 414/13 |

FOREIGN PATENT DOCUMENTS

| | | |
|---|---|---|
| 334127 | 7/1933 | Canada ............ 203/17 |
| 690778 | 7/1964 | Canada ............ 186/11 |
| 726529 | 1/1966 | Canada ............ 198/22 |
| 1018472 | 10/1977 | Canada ............ 203/18 |
| 1018931 | 10/1977 | Canada ............ 203/18 |
| 1140139 | 11/1962 | Fed. Rep. of Germany . |

OTHER PUBLICATIONS

Master-Veyor brochure, published by Speed Check Conveyor Co. Inc., Decatur, Ga., p. 104.
Sorting Carousel brochure, published by Dunnewolt U.S.A. Inc., Dallas, Tex., pp. 1-4.
My-T-Veyor brochure, Model No. 830, published by My-T-Veyor, Oxford, Mich., pp. 1-3.
Sort-O-Veyor brochure, published by Speed Check Conveyor Co., Inc., Decatur, Ga., pp. 1-4.
Quick Assembly brochure, published by Natmar Inc., Cincinnati, Ohio, pp. 1-2.
Controlling Hospital Garments, Wim Giezeman, Textile Rental, Jun. 1982, pp. 34-36, 38.

Primary Examiner—Joseph E. Valenza
Attorney, Agent, or Firm—Kenyon & Kenyon

[57] ABSTRACT

A carrier assembly is adapted to releasably support hooked members for supporting articles to be conveyed. Each carrier assembly has a frame and several integral biasing and latch members, each pivotally supported on the frame by a pin member. Each pin member is releasably coupled to the frame to facilitate the removal of each integral biasing and latch member from the frame for repair or replacement. Each integral biasing and latch member has a latch portion and integral biasing portion. The biasing portion normally biases the latch portion into a first position for supporting a hooked member, and the latch portion is adapted to be flexed relative to the biasing portion into a second position for receiving or releasing a hooked member.

28 Claims, 5 Drawing Sheets

CARRIER ASSEMBLY

FIELD OF THE INVENTION

The present invention relates to apparatus for conveying articles and, in particular, to apparatus for conveying articles supported on hooked members, such as articles of clothing supported on hangers in laundry and dry cleaning facilities.

BACKGROUND INFORMATION

An apparatus for conveying articles of clothing supported on hangers is shown in U.S. Pat. No. 4,239,435, dated Dec. 16, 1980, to Weiss et al., which shows a sorting conveyor used to sort articles of clothing for delivery to customers. The sorting conveyor is made up of a plurality of carrier assemblies coupled to each other in an end-to-end fashion. Each carrier assembly includes several latch receptacles having a latch mechanism adapted to support the hooked end of a hanger within the receptacle. Each latch mechanism in turn includes a latch member and a separate torsion spring which normally biases the latch member to block the opening of the receptacle and support the hooked end of a hanger within the receptacle.

In normal operation, the latch mechanisms wear and need to be repaired or replaced. However, typically the entire carrier assembly must be disassembled in order to repair or replace a single latch mechanism. Upon disassembly, the torsion springs frequently fly out of the carrier assembly thus creating a serious safety hazard and making reassembly of the carrier more difficult. Each carrier assembly also has many different components assembled together with rivets and other types of fasteners, thus making disassembly and reassembly a difficult and time consuming procedure.

SUMMARY OF THE INVENTION

The present invention is directed to an apparatus for supporting and conveying hooked members. The apparatus comprises a carrier frame including a plurality of receptacles formed therein and each adapted to receive a hooked member. A plurality of latch members are each pivotally supported on the carrier frame within a respective receptacle. Each latch member includes a latch portion and integral biasing portion adapted to be flexed relative to the latch portion. The latch portion includes a support surface for supporting a hooked member thereon, and is normally biased by the biasing portion into a first position for supporting a hooked member within the receptacle. The latch portion is also adapted to be flexed toward the biasing portion into a second position for receiving or releasing a hooked member.

In an apparatus of the present invention, each latch member is pivotally supported on the carrier frame by a pin member. Each pin member is in turn releasably supported within a respective aperture formed in the carrier frame to facilitate removal of the latch members from the carrier frame for repair or replacement. Each latch member further defines a mounting aperture extending therethrough and adapted to receive a respective pin member for pivotally supporting the respective latch member on the frame. Each pin member is adapted to be press fitted within the respective mounting aperture and is, in turn, adapted to rotate in the respective aperture in the frame to pivotally support the respective latch member on the frame.

An apparatus of the present invention further comprises a first carrier frame defining a plurality of first apertures spaced apart from each other and extending therethrough. A second carrier frame is coupled to the first frame and defines a plurality of second apertures spaced apart from each other and extending therethrough. Each second aperture corresponds in position to a respective first aperture, thus forming a sensing aperture extending through the first and second frames. Each latch member preferably corresponds in position to a respective sensing aperture.

One advantage of the apparatus of the present invention, is that each integral biasing and latch member is adapted to be replaced without disassembly of the entire carrier assembly.

Other advantages of the apparatus of the present invention will become apparent in view of the following detailed description and drawings taken in connection therewith.

DETAILED DESCRIPTION

Figure 1:
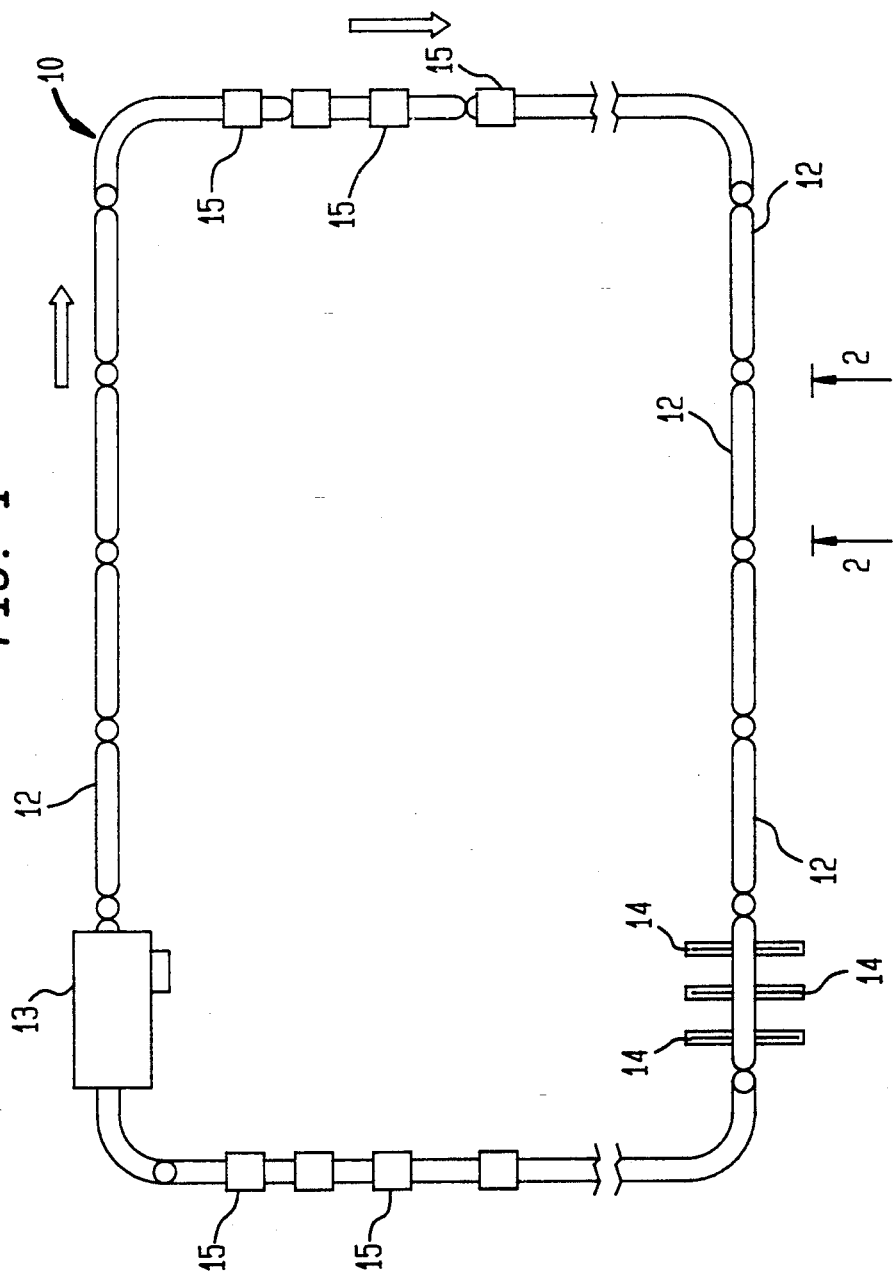
FIG. 1 is a schematic, top plan view of a sorting conveyor including an apparatus embodying the present invention.
Figure 2:
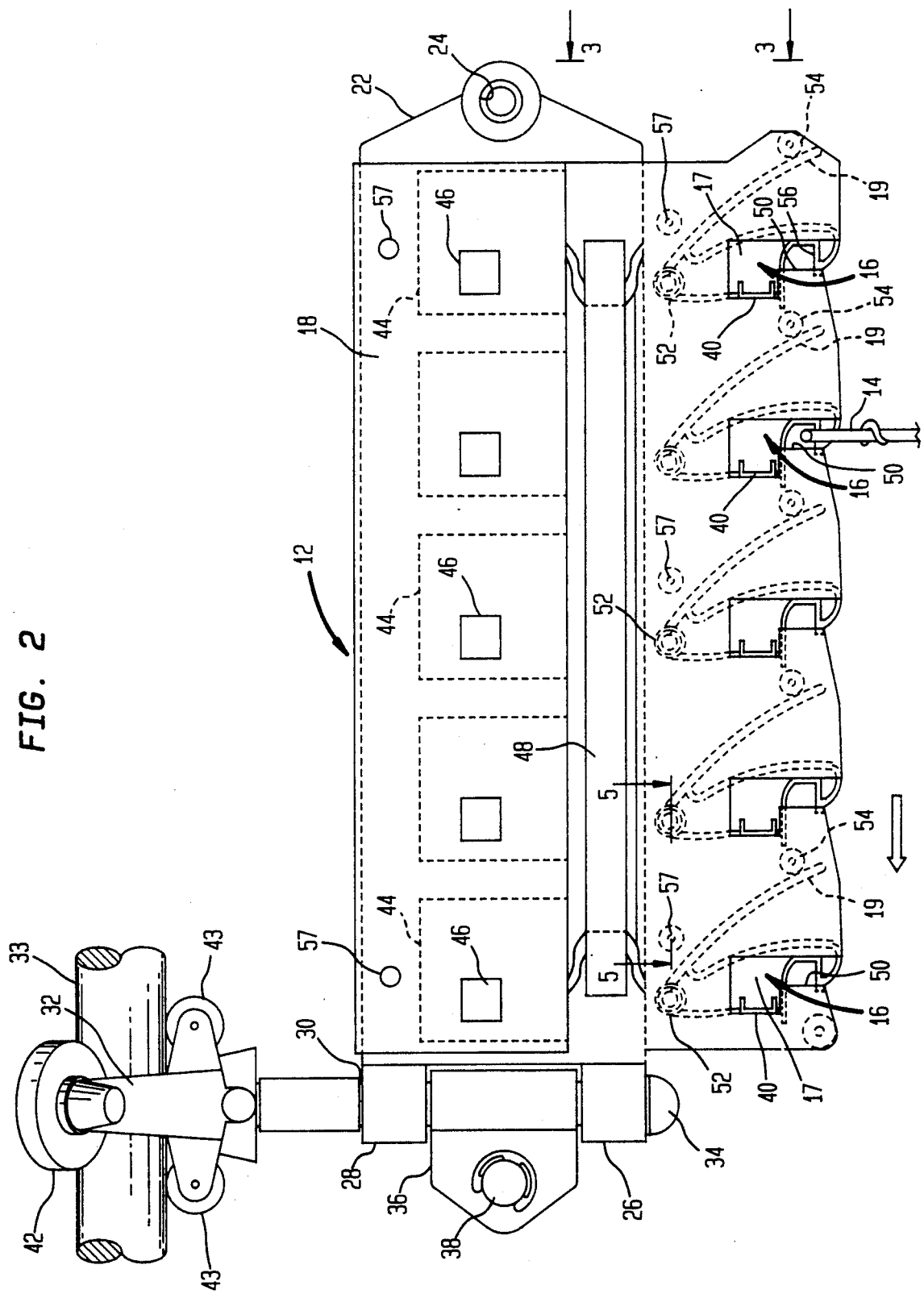
FIG. 2 is a partial, side plan view of a typical carrier assembly embodying the present invention taken along the line 2-2 of FIG. 1.

FIG. 1 illustrates a sorting conveyor 10 for sorting articles supported on hooked members, such as articles of clothing supported on hangers. The sorting conveyor 10 includes a plurality of carrier assemblies embodying the present invention, each indicated generally by the reference numeral 12. The carrier assemblies 12 are coupled together in an end-to-end fashion, thus forming the sorting conveyor 10. As shown in FIG. 2, each carrier assembly 12 includes a plurality of integral biasing and latch members 16, which are each adapted to releaseably support a hooked member 14. Thus, each carrier assembly 12 supports several hooked members 14 and conveys the hooked members along the path of the sorting conveyor 10.

The sorting conveyor 10 further includes a loading station 13 for loading the hooked members 14 into the integral biasing and latch members 16. The loading station 13 can be the same as that shown and described in co-pending U.S. Pat. Application Ser. No., entitled "Apparatus For Loading Articles", filed on even date herewith and assigned to the same assignee as is the present invention, which is hereby expressly incorporated by reference herein. The sorting conveyor 10 further includes several drop-off stations 15 located at various points along the conveyor, as shown in FIG. 1. The drop-off stations 15 are adapted to receive the hooked members 14 released from the integral biasing and latch members 16. Preferably, the articles supported on the hooked members 14 are each sorted into a predetermined drop-off station 15. Each drop-off station 15 can be the same as that shown and described in co-pending U.S. Pat. Application Ser. No. 643,435, entitled "Apparatus For Unloading Articles", filed on even date herewith and assigned to the same assignee as is the present invention, which is hereby expressly incorporated by reference herein.

Figure 3:
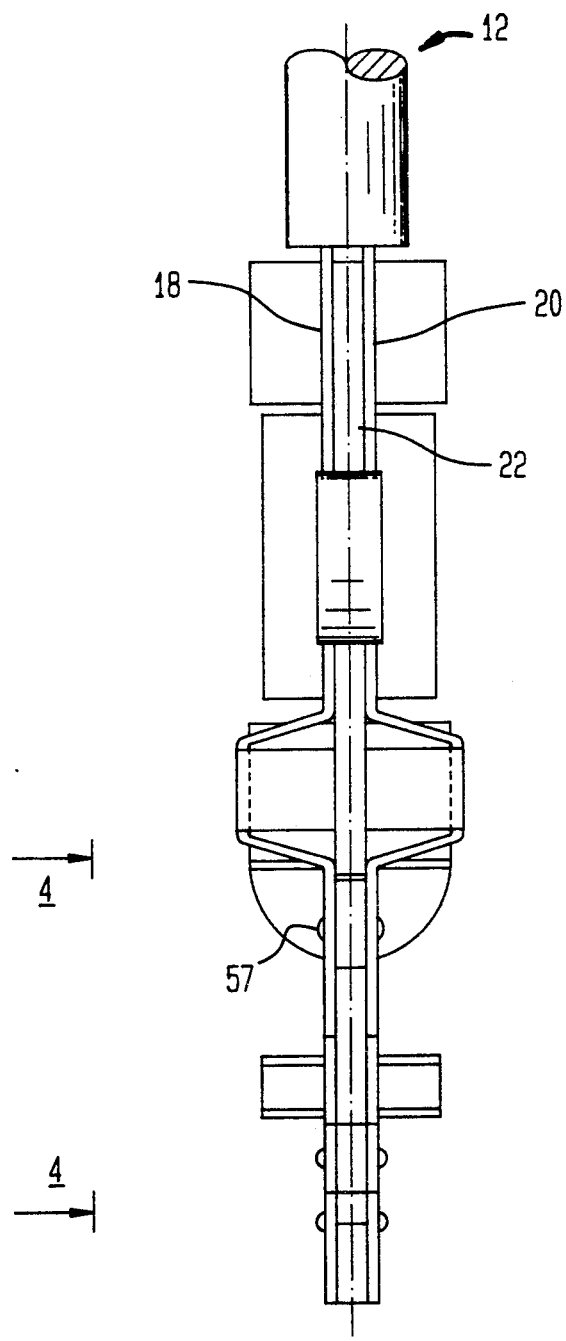
FIG. 3 is an end view of the carrier assembly of FIG. 2 taken along the line 3—3 of FIG. 2.

Each carrier assembly 12 includes a first carrier frame 18 on one side, and a second carrier frame 20 coupled to the first frame 18 on the other side, as shown in FIG. 3. A link frame 22 is coupled between the first frame 18 and second frame 20. As shown in FIG. 2, the link frame 22 includes a mounting aperture 24 extending through one end, which is adapted to receive a mounting pin, as is described further below. The other end of the link frame 22 includes a first mounting flange 26 on the bottom corner and a second mounting flange 28 on the top corner. The first and second mounting flanges 26 and 28 are each adapted to receive a support shaft 30, as shown in FIG. 2. The support shaft 30 is coupled on one end to a yoke 32, which is in turn supported from a conveyor rail 33 which defines the path of the sorting conveyor 10. The support shaft 30 includes a knob 34 on the other end to support the carrier frame 22 and, thus, the carrier assembly 12. The support shaft 30 is rotatable relative to the mounting flanges 26 and 28, thus permitting the carrier 12 to pivot relative to the yoke 32, when conveyed, for example, around a corner of the conveyor rail 33.

A connecting member 36 is fitted over the support shaft 30 between the bottom flange 26 and top flange 28, as shown in FIG. 2. A connecting pin 38 extends through the connecting member 36 and is adapted to be fitted through the mounting aperture 24 of the adjacent link frame 22 (not shown in FIG. 2) to connect the two carrier assemblies 12 together. Each connecting pin 38 is dimensioned to fit loosely within the respective mounting aperture 24 to permit the carrier assemblies 12 to pivot relative to each other when conveyed, for example, around a corner of the conveyor rail 33.

The yoke 32 is supported by bearings (not shown) within the end of the support shaft 30, and is therefore adapted to be pivoted about the axis of the support shaft. The yoke 32 includes a pair of first rollers 42, each rotatably supported on the free end of each leg of the yoke, as shown in FIG. 2. A pair of second rollers 43 are supported on either side of the yoke 32 and maintained in sliding contact with the underside of the conveyor rail 33. The first rollers 42 and second rollers 43 are adapted to permit the yoke 32 and, thus, the carrier assembly 12 to move along the conveyor rail 33.

As shown in FIG. 2, the link frame 22 includes a plurality of square apertures 44 (illustrated in dashed lines) spaced apart from each other along the length of the frame. The first carrier frame 18 and the second carrier frame 20 also each include a plurality of square apertures 46 smaller in comparison to each square aperture 44 and spaced apart from each other along the length of each respective frame. As shown in FIG. 2, each aperture 44 corresponds in position to a respective aperture 46 and, thus, each aperture 46 extends through the carrier assembly 12. The first carrier frame 18 and the second carrier frame 20 each include a bumper portion 48 extending substantially along the length of the respective frame.

As shown in FIG. 2, the carrier assembly 12 includes a plurality of latch receptacles 50 formed within the bottom portions of the first carrier frame 18 and second carrier frame 20 and spaced apart from each other. Each latch receptacle 50 is adapted to receive a respective integral biasing and latch member 16, as shown in FIG. 2. Thus, each integral biasing and latch member 16 is adapted to releasably support a hooked member 14 within the respective receptacle 50.

As shown in FIG. 2, each aperture 46 is substantially aligned with and, thus, corresponds in position to a respective latch receptacle 50. The apertures 46 are, accordingly, provided for sensing the position of the latch receptacles 50 and, thus, the hooked members 14 supported by the integral biasing and latch members 16 within the receptacles. A sensor and corresponding target (not shown) can be mounted on either side of the carrier assembly 12 and adapted to sense the passage of each aperture 46 between the sensor and target during operation of the sorting conveyor 10. A control system (not shown) can in turn be adapted to count each passing aperture 46 and, thus, each hooked member 14 and article supported by the corresponding integral biasing and latch member 16, in order to sort the articles into predetermined drop-off stations 15.

Figure 4:
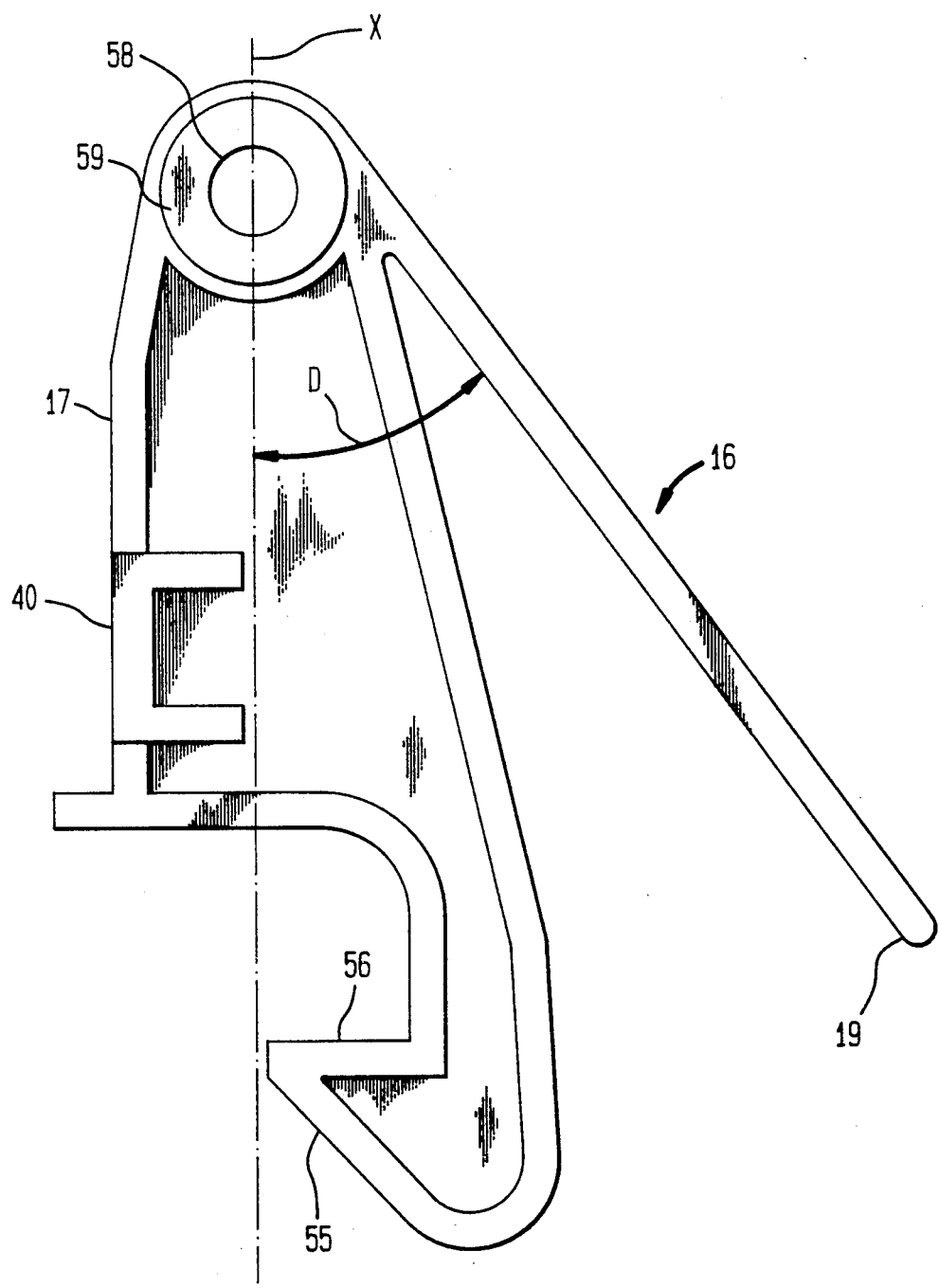
FIG. 4 is an enlarged plan view of a latch mechanism of the carrier assembly of FIG. 2.
Figure 5:
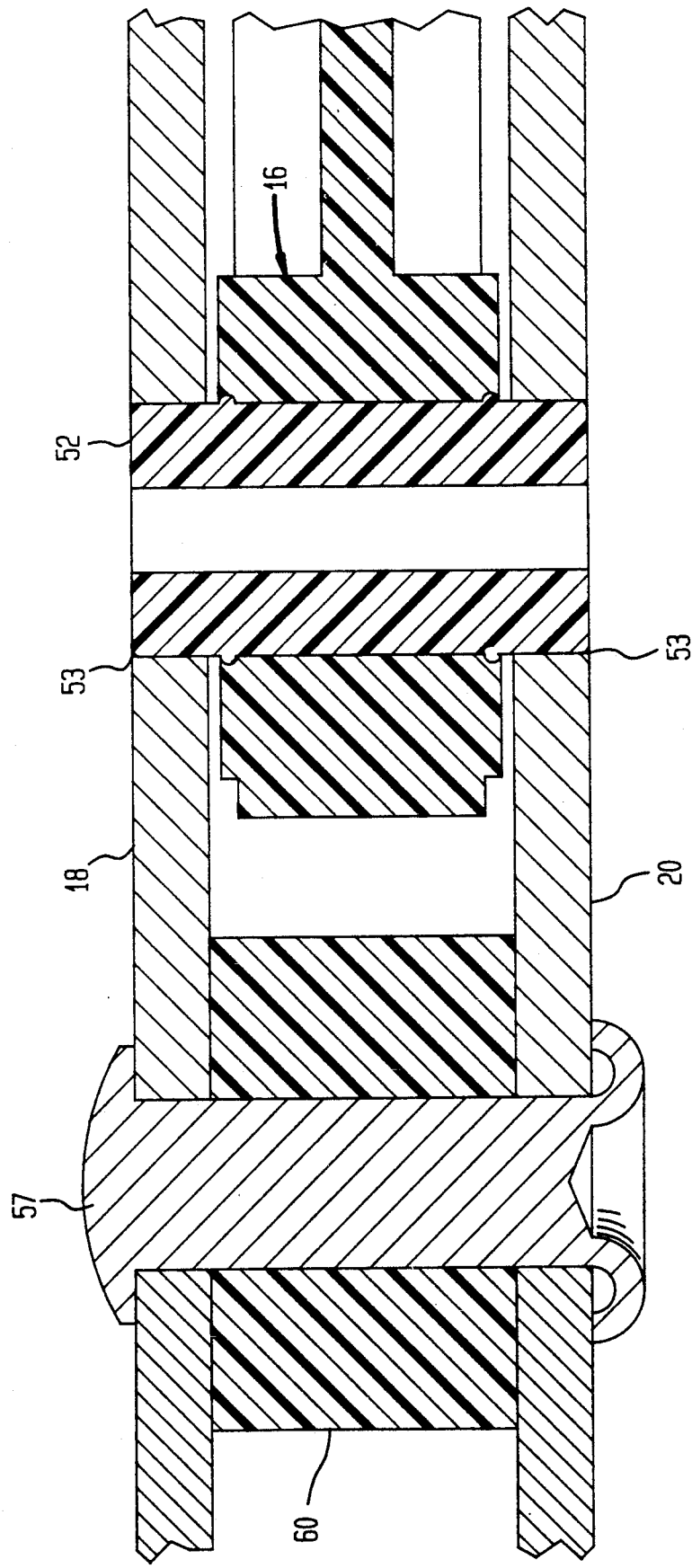
FIG. 5 is an enlarged partial cross-sectional view of the carrier assembly of FIG. 2, taken along the line 5—5 of FIG. 2.

As shown in FIG. 4, each integral biasing and latch member 16 includes a latch portion 17 and an integral spring arm 19. Each integral biasing and latch member 16 is preferably molded from a plastic material, such as CELCON M90, manufactured by Marna Plastics. Each integral biasing and latch member 16 is pivotally supported within the respective latch receptacle 50 by a latch pin 52 extending between the first carrier frame 18 and the second carrier frame 20, as shown in FIG. 5. Each spring arm 19 rests on its free end against a washer 54, which extends between the first carrier frame 18 and second carrier frame 20, as indicated in dashed lines in FIG. 2. Each spring arm 19 flexibly biases the respective latch portion 17 in the direction of the conveyor flow, as indicated by the arrow in FIG. 2. Thus, each latch portion 17 is normally biased to block the opening of the respective latch receptacle 50, as shown in FIG. 2.

As shown in FIG. 4, each latch portion 17 includes a chamfered surface 55 on its free end in order to facilitate the insertion of a hooked member 14 into the respective latch receptacle 50. Each latch portion 17 also includes a support surface 56 located immediately above the chamfered surface 55 for receiving and supporting a hooked member 14. Each latch portion 17 also includes a pair of flanges 59 formed on either side of its top end, and a mounting aperture 58 extending through the two flanges 59, as shown in FIG. 4. Each mounting aperture 58 is adapted to slidably receive a respective latch pin 52, which is preferably molded out of a plastic material, such as Celcon M90. As shown in FIG. 4, the spring arm 19 is integrally coupled on one end to the latch portion 17 adjacent to the flanges 59 and projects downwardly therefrom. The spring arm 19 is oriented at an angle D relative to the longitudinal axis X of the latch portion 17. In the embodiment of the present invention illustrated, the angle D is approximately 38°, which, however, is purely exemplary.

A plurality of receiving apertures 53 extend through the first carrier frame 18 and second carrier frame 20, respectively (FIG. 5), and are each adapted to receive a respective latch pin 52. The outer diameter of each latch pin 52 is dimensioned so that it is slightly less than the diameter of the corresponding aperture 53 and, thus, forms a clearance fit when pressed into the aperture. Each latch pin 52 is therefore free to rotate within the respective aperture 53. Each mounting aperture 58 in the latch portions 17, on the other hand, is dimensioned to form an interference fit with the corresponding latch pin 52. Thus, each latch portion 17 is substantially fixed on a respective latch pin 52, which is in turn adapted to rotate within the corresponding aperture 53. Each latch portion 17 is mounted on the respective latch pin 52 and thus adapted to pivot toward and away from its respective spring arm 19, as is described further below.

A hooked member 14 is supported by an integral biasing and latch member 16 by inserting the hooked member into the respective receptacle 50 and, thus, forcing the hooked member against the chamfered surface 55. As illustrated in FIG. 2, each latch portion 17 is normally biased by the respective spring arm 19 into a first position blocking the opening of the receptacle 50. As the hooked member 14 is pushed upwardly against the chamfered surface 55, however, the latch portion 17 is flexed inwardly toward the spring arm 19 into a second position away from the opening of the receptacle 50. Then, when the hooked member 14 is pushed beyond the chamfered surface 55 and into the receptacle 50, the biasing arm 19 biases the latch portion 17 back in the direction of the conveyor flow (as indicated by the arrow in FIG. 2) into the first position. The hooked member 14 is then seated on the support surface 56 within the receptacle 50, as shown in FIG. 2.

Each integral biasing and latch member 16 further includes a pair of tabs 40 projecting outwardly from either side of the latch portion 17. Each latch portion 17 is therefore adapted to be moved from the first position into the second position away from the opening of the respective latch receptacle 50, by moving either of the tabs 40 in the direction opposite the direction of conveyor flow. Thus, a hooked member 14 can be released from a respective integral biasing and latch member 16 by pushing either of the tabs 40 in the direction opposite the direction of conveyor flow. As the latch portion 17 is moved into the second position, the hooked member 14 slides off the support surface 56 and drops out of the receptacle 50.

The carrier assembly 12 further includes a number of rivets 57 extending between the first carrier frame 18 and the second carrier frame 20 to hold the two carrier frames together. As shown in FIG. 5, some of the rivets 57 located in the lower portion of the carrier assembly 12 extend through the washers 60.

The carrier assembly of the present invention permits each integral biasing and latch member 16 to be easily removed from the carrier assembly for repair or replacement by simply removing the respective latch pin 52 by placing one end of a screw driver, for example, against the pin, and by tapping the other end of the screw driver with a hammer to pop the latch pin out of the carrier assembly. Once the latch pin 52 is removed, the integral biasing and latch member 16 will drop away from the carrier assembly 12 through the respective receptacle 50. Another integral biasing and latch member 16 is then simply inserted into the receptacle 50, and a latch pin 52 is press fitted through the apertures 53 and 58 to support the integral biasing and latch member within the receptacle.

Thus, because the integral biasing and latch member 16 is formed as an integral component, including both the latch portion 17 and the spring arm 19, and because the latch pin 52 is press fitted within the carrier assembly, the difficulty in removing and replacing the latch member is significantly reduced in comparison to prior art systems. Also, as will be recognized by those skilled in the art, because the carrier assembly 12 includes relatively few components, the ease of assembly is substantially improved over prior art systems. Moreover, the simple shapes of the components, such as the first carrier frame 18, second carrier frame 20, and link frame 22, permits the components to be easily stamped from sheet metal. Accordingly, the overall cost of fabricating and maintaining a conveying system including carrier assemblies 12 can be significantly reduced.

We claim:

1. An apparatus for supporting and conveying hooked members comprising:
   a frame including at least one receptacle formed therein adapted to receive a hooked member, and defining at least one aperture corresponding in position to the at least one receptacle; and
   at least one latch member pivotally supported within the receptacle and including a latch portion and integral biasing portion adapted to be flexed relative to the latch portion, the latch portion including a support surface adapted to support a hooked member and being normally biased into a first position supporting a hooked member within the receptacle and adapted to be flexed toward the biasing portion into a second position for receiving or releasing the hooked member.

2. An apparatus according to claim 1 wherein each latch member further comprises a bevelled surface adapted to be engaged by a hooked member to facilitate the insertion of a hooked member into the receptacle.

3. An apparatus according to claim 1 wherein each latch member is fabricated from a plastic material.

4. An apparatus according to claim 1 wherein the biasing portion is oriented at an acute angle relative to the latch portion.

5. An apparatus according to claim 1 wherein each latch member further comprises at least one tab projecting outwardly therefrom and adapted to be engaged to move the latch portion from the first position into the second position.

6. An apparatus according to claim 1 wherein the frame includes a first and second carrier frame and a link frame coupled between the first carrier frame and the second carrier frame.

7. An apparatus for supporting and conveying hooked members comprising:
   a frame including at least one receptacle formed therein for receiving a hooked member, and further including a first and second carrier frame and a link frame coupled between the first carrier frame and the second carrier frame, wherein the link frame includes a plurality of first apertures, and the first and second carrier frames include a plurality of second apertures, and each second aperture corresponds in position to a respective first aperture; and
   at least one latch member pivotally supported within the receptacle and including a latch portion and integral biasing portion adapted to be flexed relative to the latch portion, the latch portion including a support surface adapted to support a hooked member and being normally biased into a first position for supporting a hooked member within the receptacle and adapted to be flexed toward the biasing portion into a second position for receiving or releasing the hooked member.

8. An apparatus for supporting and conveying hooked members comprising:

a frame including a plurality of receptacles formed therein, each receptacle being adapted to receive a hooked member, and defining a plurality of apertures formed therethrough, each aperture corresponding in position to a respective receptacle; and at least one latch member pivotally supported within the receptacle and including a latch portion and integral biasing portion adapted to be flexed relative to the latch portion, the latch portion including a support surface adapted to support a hooked member and being normally biased into a first position for supporting a hooked member within the receptacle and adapted to be flexed toward the biasing portion into a second position for receiving or releasing the hooked member.

9. An apparatus for supporting hooked members, comprising:

a carrier frame including a plurality of receptacles formed therein, each receptacle being adapted to receive a hooked member, wherein the carrier frame defines at least one aperture corresponding in position to a respective receptacle; and a plurality of latch members, each latch member being pivotally supported on the carrier frame within a respective receptacle and including a latch portion and integral biasing portion, the biasing portion being adapted to be flexed relative to the latch portion, the latch portion including a support surface adapted to support a hooked member thereon, the latch portion being normally biased by the biasing portion into a first position for supporting a hooked member within the respective receptacle and adapted to be flexed toward the biasing portion into a second position for receiving or releasing a hooked member.

10. An apparatus according to claim 9, wherein each latch member is pivotally supported on the carrier frame by a pin member, and each pin member is in turn releasably supported within a respective aperture formed in the carrier frame to facilitate removal of the latch members from the carrier frame for repair or replacement.

11. An apparatus according to claim 9 wherein each latch portion defines a chamfered surface adapted to be contacted by a hooked member for facilitating insertion of the hooked member into the respective receptacle.

12. An apparatus according to claim 9 wherein each latch member is fabricated from a plastic material.

13. An apparatus according to claim 9 wherein each biasing portion is oriented at an acute angle relative to the respective latch portion.

14. An apparatus according to claim 9 wherein each latch member further includes a tab portion projecting outwardly from the latch portion and adapted to be engaged to move the latch portion from the first position into the second position.

15. An apparatus according to claim 9 wherein the carrier frame comprises a first carrier frame, a second carrier frame, and a link frame coupled between the first carrier frame and the second carrier frame.

16. An apparatus for supporting hooked members, comprising:

a carrier frame including a plurality of receptacles formed therein, each receptacle being adapted to receive a hooked member, wherein the carrier frame comprises a first carrier frame, a second carrier frame, and a link frame coupled between the first carrier frame and the second carrier frame, and the link frame defines a plurality of first apertures extending therethrough, and the first and second carrier frames each define a plurality of second apertures extending therethrough, and each second aperture corresponds in position to each first aperture and, thus, extends through the frame; and a plurality of latch members, each latch member being pivotally supported on the carrier frame within a respective receptacle and including a latch portion and integral biasing portion, the biasing portion being adapted to be flexed relative to the latch portion, the latch portion including a support surface adapted to support a hooked member thereon, the latch portion being normally biased by the biasing portion into a first position for supporting a hooked member within the respective receptacle and adapted to be flexed toward the biasing portion into a second position for receiving or releasing a hooked member.

17. An apparatus according to claim 16 wherein each of the second apertures corresponds in position to a respective receptacle.

18. An apparatus according to claim 10 wherein each latch member further defines a mounting aperture extending therethrough and adapted to receive a respective pin member for pivotally supporting the respective latch member on the frame.

19. An apparatus according to claim 18 wherein each pin member is adapted to be press fit within the respective mounting aperture and is in turn adapted to rotate in the respective aperture in the frame to pivotally support the respective latch member on the frame.

20. An apparatus for supporting hooked members comprising:

a first frame defining a plurality of first apertures spaced apart from each other and extending therethrough;

a second frame coupled to the first frame and defining a plurality of second apertures spaced apart from each other and extending therethrough, each second aperture corresponding in position to a respective first aperture, thus forming a sensing aperture extending through the first and second frames; and a plurality of latch members pivotally supported on the first and second frames, each latch member corresponding in position to a respective sensing aperture and being adapted to releaseably support a hooked member.

21. An apparatus as defined in claim 20 further comprising a link frame coupled between the first frame and the second frame.

22. An apparatus as defined in claim 20, wherein each latch member includes a latch portion and integral biasing portion, the latch portion being adapted to support a hooked member and being normally biased by the biasing portion into a first position for supporting a hooked member and adapted to be moved relative to the biasing portion into a second position for receiving or releasing a hooked member.

23. An apparatus as defined in claim 22, further comprising a plurality of pin members, each pin member extending between the first and second frames and pivotally supporting a latch member.

24. An apparatus as defined in claim 23, wherein each latch portion defines a mounting aperture extending therethrough for receiving a pin member, wherein each pin member is press fit into the respective mounting aperture and in turn adapted to pivot relative to the first and second frames.

25. An apparatus for supporting and conveying hooked members comprising:
   a carrier member including at least one receptacle for receiving a hooked member, and defining at least one aperture corresponding in position to the at least one receptacle; and
   at least one latch member pivotally supported within the at least one receptacle and being normally pivoted into a first position for supporting a hooked member and being pivotable into a second position for receiving or releasing a hooked member.

26. An apparatus according to claim 25, further comprising a biasing member for normally biasing the latch member into the first position.

27. An apparatus according to claim 25, wherein the latch member includes a latch portion and an integral biasing portion, the latch portion including a support surface for supporting a hooked member and being normally biased by the integral biasing portion into the first position.

28. An apparatus according to claim 25, wherein the carrier member includes a plurality of receptacles and a plurality of latch members, each latch member being pivotally supported within a respective receptacle, and the carrier member defines a plurality of apertures, each aperture corresponding in position to a respective receptacle.

* * * * *